US011915852B2

(12) United States Patent
Ishima et al.

(10) Patent No.: US 11,915,852 B2
(45) Date of Patent: Feb. 27, 2024

(54) ELECTRONIC COMPONENT

(71) Applicant: TDK CORPORATION, Tokyo (JP)

(72) Inventors: Yuya Ishima, Tokyo (JP); Shinichi Kondo, Tokyo (JP); Kosuke Ito, Tokyo (JP); Shingo Hattori, Tokyo (JP); Kazuya Tobita, Tokyo (JP); Noriaki Hamachi, Tokyo (JP); Atsushi Moriya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 366 days.

(21) Appl. No.: 16/922,533

(22) Filed: Jul. 7, 2020

(65) Prior Publication Data

US 2021/0012947 A1 Jan. 14, 2021

(30) Foreign Application Priority Data

Jul. 9, 2019 (JP) ................................ 2019-127751

(51) Int. Cl.

*H01F 5/00* (2006.01)
*H01F 27/28* (2006.01)
*H01F 41/04* (2006.01)
*H01F 27/29* (2006.01)

(52) U.S. Cl.

CPC ......... *H01F 27/2804* (2013.01); *H01F 27/29* (2013.01); *H01F 41/043* (2013.01); *H01F 2027/2809* (2013.01)

(58) Field of Classification Search

CPC .................................................. H01F 27/2804
USPC ......................................................... 336/200
See application file for complete search history.

(56) References Cited

U.S. PATENT DOCUMENTS

| | | | | |
|---|---|---|---|---|
| 2012/0019099 | A1 | 1/2012 | Sato et al. | |
| 2012/0188682 | A1 | 7/2012 | Sato et al. | |
| 2014/0312743 | A1 | 10/2014 | Sato et al. | |
| 2016/0012957 | A1* | 1/2016 | Lim | H01F 17/0013 336/200 |
| 2017/0103848 | A1 | 4/2017 | Yoneda et al. | |
| 2018/0068780 | A1 | 3/2018 | Shimoda et al. | |
| 2019/0051450 | A1* | 2/2019 | Shimoda | H01F 27/30 |
| 2019/0066912 | A1* | 2/2019 | Takeda | H01F 27/323 |
| 2020/0286672 | A1* | 9/2020 | Yang | H01F 27/255 |
| 2021/0166864 | A1 | 6/2021 | Shimoda et al. | |

(Continued)

FOREIGN PATENT DOCUMENTS

| | | |
|---|---|---|
| JP | 2012-028458 A | 2/2012 |
| JP | 2012-164966 A | 8/2012 |
| JP | 2017-073536 A | 4/2017 |

(Continued)

OTHER PUBLICATIONS

English translation of JP2013183009 (Year: 2013).*

*Primary Examiner* — Ronald Hinson
(74) *Attorney, Agent, or Firm* — Oliff PLC

(57) ABSTRACT

An electronic component according to an aspect of the present disclosure includes an element body and a terminal electrode. The element body includes an outer surface provided with a depression. The terminal electrode is disposed on the element body. The terminal electrode includes a first electrode portion and a second electrode portion. The first electrode portion is disposed in the depression. The second electrode portion protrudes from the depression. The second electrode portion is thicker than the first electrode portion.

10 Claims, 5 Drawing Sheets

(56) References Cited

U.S. PATENT DOCUMENTS

| | | | |
|---|---|---|---|
| 2022/0028601 | A1 | 1/2022 | Shimoda et al. |
| 2022/0051844 | A1 | 2/2022 | Shimoda et al. |

FOREIGN PATENT DOCUMENTS

| | | | |
|---|---|---|---|
| JP | 2018-041864 | A | 3/2018 |
| JP | 2019-046936 | A | 3/2019 |

* cited by examiner

ELECTRONIC COMPONENT

TECHNICAL FIELD

The present disclosure relates to an electronic component.

BACKGROUND

Japanese Unexamined Patent Publication No. 2017-73536 discloses a multilayer inductor including a component body formed by laminating a plurality of insulator layers, a coil conductor disposed inside the component body, and an external terminal electrode electrically connected to the coil conductor. In this multilayer inductor, the external terminal electrode is embedded in the component body.

SUMMARY

In the above multilayer inductor, when the component body and the external terminal electrode are formed by, for example, co-firing, cracks can occur due to the difference in the thermal shrinkage coefficient.

One aspect of the present disclosure provides an electronic component in which occurrence of cracks is suppressed.

An electronic component according to an aspect of the present disclosure includes an element body and a terminal electrode. The element body includes an outer surface provided with a depression. The terminal electrode is disposed on the element body. The terminal electrode includes a first electrode portion and a second electrode portion. The first electrode portion is disposed in the depression. The second electrode portion protrudes from the depression. The second electrode portion is thicker than the first electrode portion.

In this electronic component, the depression is provided on the outer surface of the element body. The terminal electrode includes, in addition to the first electrode portion disposed in the depression, the second electrode portion protruding from the depression. Thus, as compared with the case in which the terminal electrode does not include the second electrode portion, that is, the case in which the entire terminal electrode is disposed in the depression, the stress generated between the element body and the terminal electrode due to the difference in the thermal shrinkage coefficient is reduced when, for example, the element body and the terminal electrode are co-fired. As a result, the occurrence of cracks is suppressed. In addition, since the second electrode portion is thicker than the first electrode portion, the occurrence of cracks is further suppressed.

The outer surface may include a main face constituting a mounting surface and an end face adjacent to the main face. The depression may include an end-face depression provided on the end face and a main-face depression provided on the main face. The first electrode portion may include a first end-face electrode part disposed in the end-face depression and a first main-face electrode part disposed in the main-face depression. The second electrode portion may include a second end-face electrode part protruding from the end-face depression and a second main-face electrode part protruding from the main-face depression. In this case, the terminal electrode is provided not only on the main face side of the element body but also on the end face side of the element body. Therefore peeling of the terminal electrode is suppressed.

The element body may have a rectangular parallelepiped shape. The outer surface may include a first main face constituting a mounting surface, a second main face opposed to the first main face, a pair of side faces opposed to each other, and a pair of end faces opposed to each other. The electronic component may have a length of 1 mm or less in a direction in which the pair of side faces are opposed to each other. The electronic component may have a length of 2 mm or less in a direction in which the pair of end faces are opposed to each other. In this case, the occurrence of cracks is also suppressed.

The element body may contain a sintered body of an insulating material. The terminal electrode may contain a sintered body of a conductive material. In this case, it is possible to suppress cracks occurring due to the difference in the thermal shrinkage coefficient between the insulating material and the conductive material.

The electronic component may include a plurality of terminal electrodes. In this case, the occurrence of cracks due to each terminal electrode is further suppressed.

The electronic component further includes a coil disposed inside the element body, and the terminal electrode may be connected to the coil. In this case, the occurrence of cracks is also suppressed.

DETAILED DESCRIPTION

Hereinafter, an embodiment will be described in detail with reference to the accompanying drawings. In the description of the drawings, identical or equivalent elements are denoted by the same reference signs, and overlapped descriptions are omitted.

Figure 1:
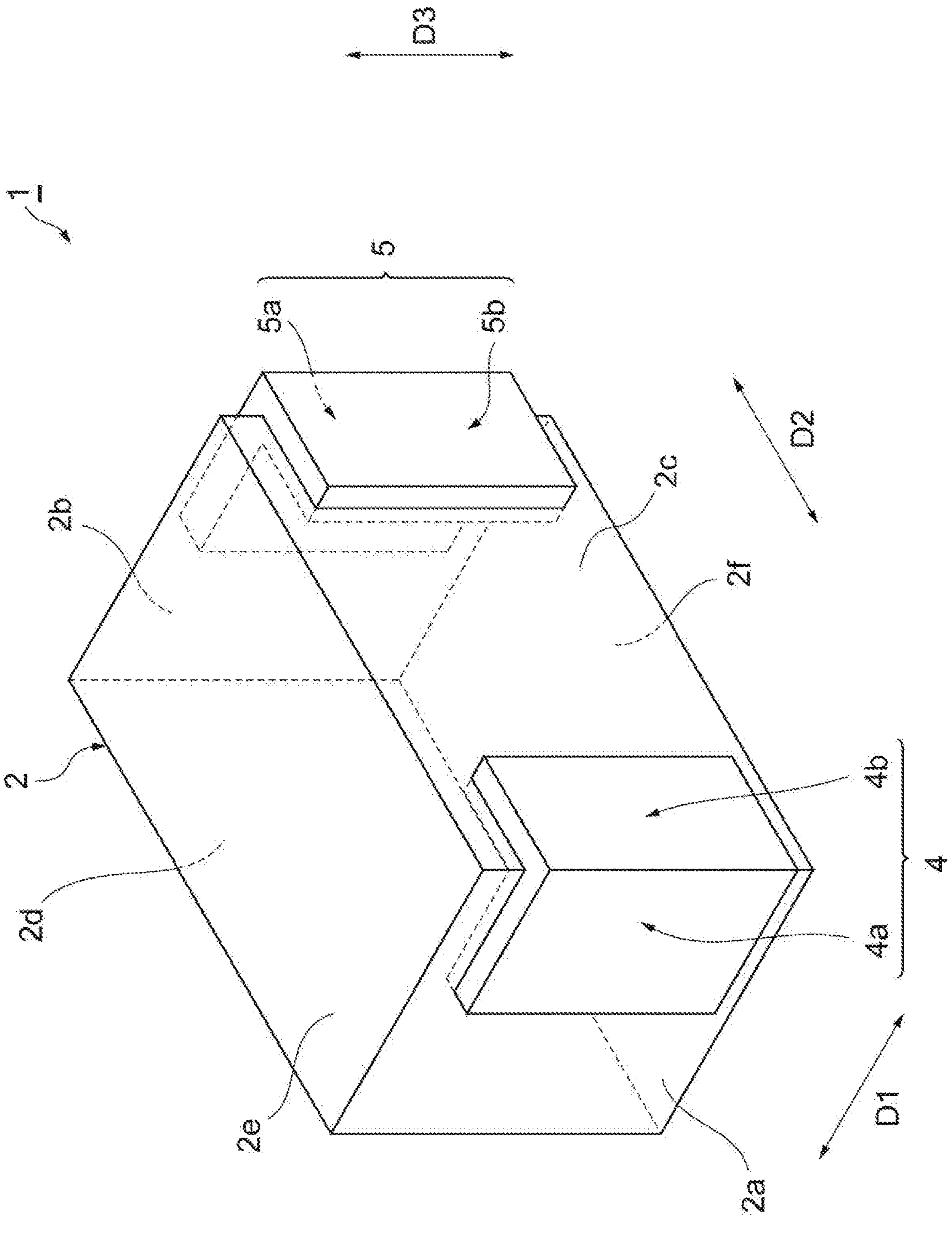
FIG. 1 is a perspective view of a multilayer coil component according to an embodiment.

As shown in FIG. 1, a multilayer coil component 1 includes an element body 2 having a rectangular parallelepiped shape, and a plurality (in this specification, a pair) of terminal electrodes 4 and 5 disposed on the element body 2. The pair of terminal electrodes 4 and 5 is disposed at both end portions of the element body 2. The rectangular parallelepiped shape includes a rectangular parallelepiped shape in which the corner portions and the ridge portions are chamfered, and a rectangular parallelepiped shape in which the corner portions and the ridge portions are rounded.

The element body 2 has, as outer surfaces, a pair of end faces **2*a* and 2*b* opposed to each other, a pair of main faces 2*c* and 2*d* opposed to each other, and a pair of side faces 2*e* and 2*f* opposed to each other. In the following description, a direction in which the pair of main faces 2*c* and 2*d* are opposed to each other is a first direction D1, a direction in which the pair of end faces 2*a* and 2*b* are opposed to each other is a second direction D2, and a direction in which the pair of side faces 2*e* and 2*f* are opposed to each other is a third direction D3. In the present embodiment, the first direction D1 is the height direction of the element body 2. The second direction D2 is the length direction of the element body 2 and is orthogonal to the first direction D1**.

The third direction D3 is the width direction of the element body 2 and is orthogonal to the first direction D1 and the second direction D2.

The pair of end faces 2*a* and 2*b* extend in the first direction D1 in such a way as to connect the pair of main faces 2*c* and 2*d*. The pair of end faces 2*a* and 2*b* also extend in the third direction D3, that is, in the short side direction of the pair of main faces 2*c* and 2*d*. The pair of side faces 2*e* and 2*f* extend in the first direction D1 in such a way as to connect the pair of main faces 2*c* and 2*d*. The pair of side faces 2*e* and 2*f* also extend in the second direction D2, that is, in the long side direction of the pair of main faces 2*c* and 2*d*. The multilayer coil component 1 is, for example, solder-mounted on an electronic device (for example, a circuit board or an electronic component).

In the multilayer coil component 1, the main face 2*c* constitutes a mounting surface opposed to the electronic device. The pair of end faces 2*a* and 2*b* are adjacent to the main face 2*c*. The length of the multilayer coil component 1 in the first direction D1 (the height) is, for example, 0.05 mm or more and 1 mm or less. The length of the multilayer coil component 1 in the second direction D2 (the length) is, for example, 0.01 mm or more and 2 mm or less. The length of the multilayer coil component 1 in the third direction D3 (the width) is, for example, 0.05 mm or more and 1 mm or less.

Figure 2:
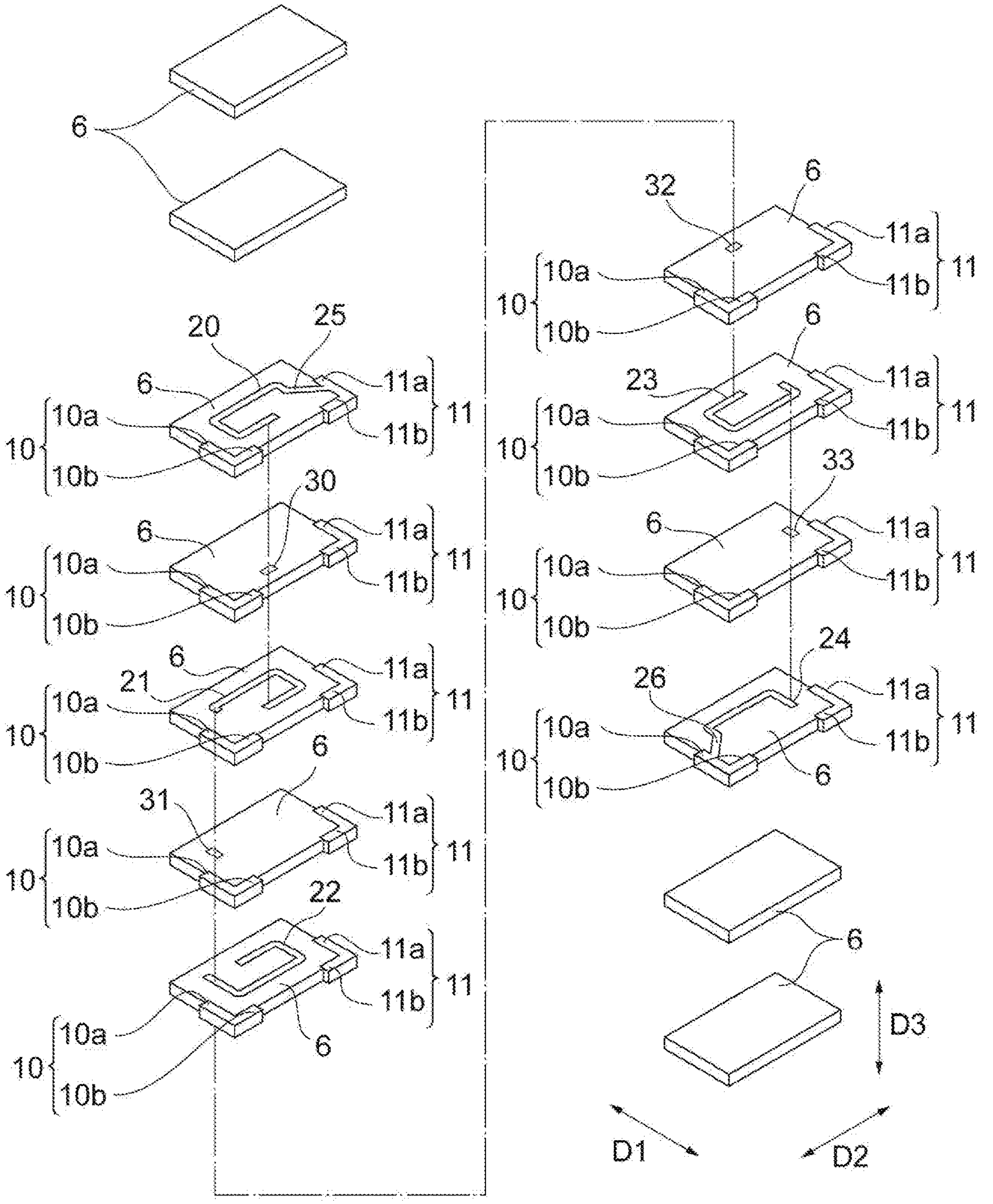
FIG. 2 is an exploded perspective view of the multilayer coil component in FIG. 1.

As shown in FIG. 2, the element body 2 is formed by laminating a plurality of insulator layers 6 in the third direction D3. The element body 2 includes the laminated insulator layers 6. In the element body 2, the lamination direction in which the insulator layers 6 are laminated is aligned with the third direction D3. In the actual element body 2, the insulator layers 6 are integrated in such a way that no boundaries between the respective insulator layers 6 can be visually recognized.

Each insulator layer 6 contains, for example, a sintered body of an insulating material. Thus, it can be said that the element body 2 contains, for example, a sintered body of an insulating material. Each insulator layer 6 is formed by, for example, a sintered body of a magnetic material. The magnetic material contains, for example, an Ni—Cu—Zn-based ferrite material, an Ni—Cu—Zn—Mg-based ferrite material, or an Ni—Cu-based ferrite material. The magnetic material forming each insulator layer 6 may contain Fe alloy. Each insulator layer 6 may be formed by a sintered body of a non-magnetic material. The non-magnetic material contains, for example, a glass ceramic material or a dielectric material. In the present embodiment, each insulator layer 6 is formed by a sintered body of a green sheet containing the magnetic material.

Figure 3:
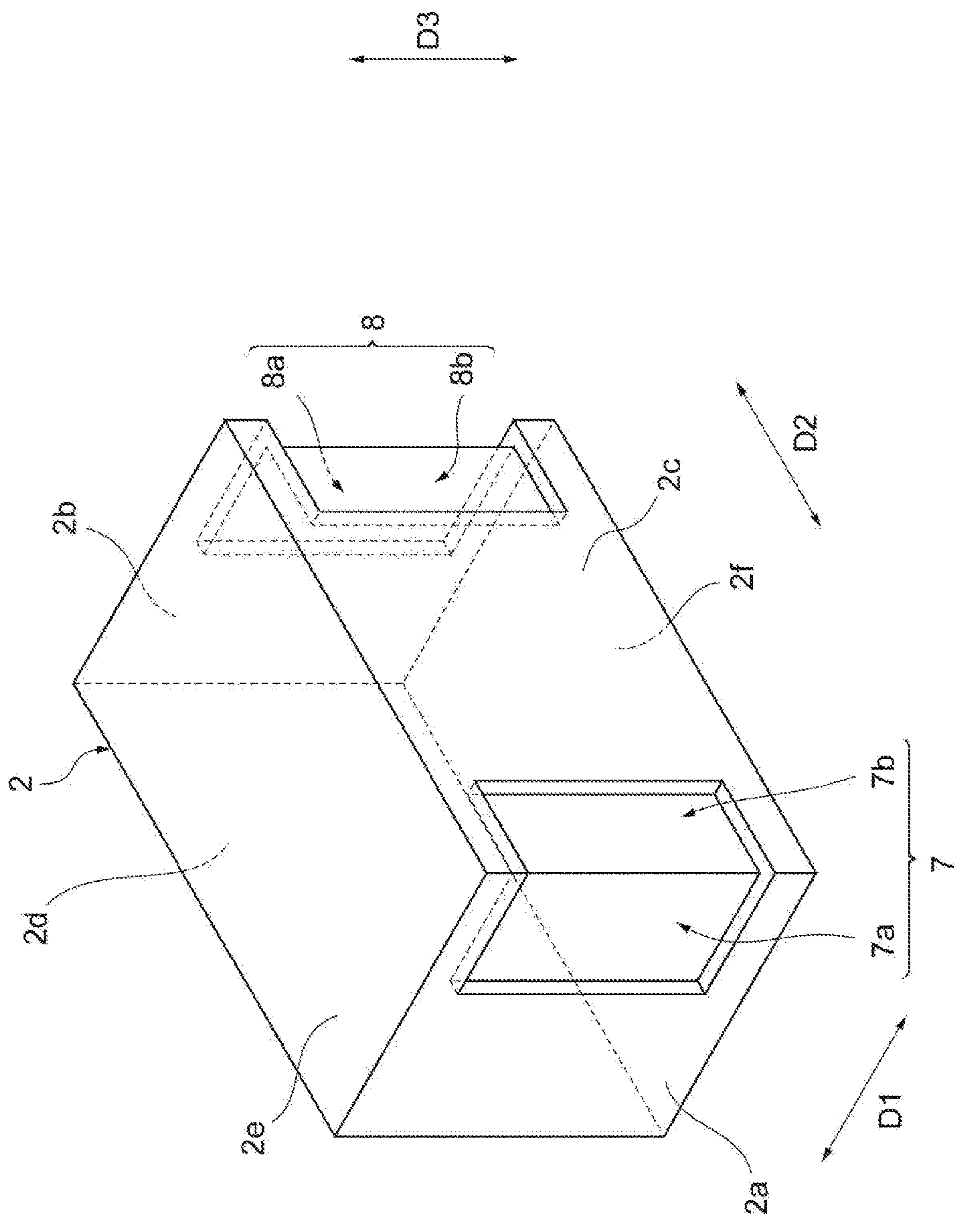
FIG. 3 is a perspective view of an element body in FIG. 1.

As shown in FIG. 3, depressions 7 and 8 are provided on the outer surfaces of the element body 2. The depressions 7 and 8 are spaces depressed inward from the outer surfaces of the element body 2. The depressions 7 and 8 each have an L shape when viewed from the third direction D3. The depressions 7 and 8 are apart from each other in the second direction D2.

The depression 7 is provided on the end face 2*a* side of the element body 2. The depression 7 includes an end-face depression 7*a* provided on the end face 2*a* and a main-face depression 7*b* provided on the main face 2*c*. The end-face depression 7*a* and the main-face depression 7*b* are integrally provided. The end-face depression 7*a* is disposed on the main face 2*c* side of the end face 2*a*. The bottom face of the end-face depression 7*a* is parallel to the end faces 2*a* and 2*b*. The bottom face of the main-face depression 7*b* is parallel to the main faces 2*c* and 2*d*.

The depression 8 is provided on the end face 2*b* side of the element body 2. The depression 8 includes an end-face depression 8*a* provided on the end face 2*b* and a main-face depression 8*b* provided on the main face 2*c*. The end-face depression 8*a* and the main-face depression 8*b* are integrally provided. The end-face depression 8*a* is disposed on the main face 2*c* side of the end face 2*b*. The bottom face of the end-face depression 8*a* is parallel to the end faces 2*a* and 2*b*. The bottom face of the main-face depression 8*b* is parallel to the main faces 2*c* and 2*d*.

As shown in FIG. 1, the pair of terminal electrodes 4 and 5 is apart from each other in the second direction D2. The terminal electrodes 4 and 5 each have an L shape when viewed from the third direction D3. Each of the terminal electrodes 4 and 5 contains, for example, a sintered body of a conductive material. The conductive material contains, for example, Ag or Pd. Each of the terminal electrodes 4 and 5 is formed as a sintered body of a conductive paste containing conductive material powder. The conductive material powder contains, for example, Ag powder or Pd powder. The surface of each of the terminal electrodes 4 and 5 may be formed with a plating layer. The plating layer is formed by, for example, electroplating or electroless plating. The plating layer contains, for example, Ni, Sn, or Au.

The terminal electrode 4 is disposed on the end face 2*a* side of the element body 2. The terminal electrode 4 is disposed from the end face 2*a* to the main face 2*c*. The terminal electrode 4 is provided in the depression 7 (see FIG. 3). The terminal electrode 4 includes an electrode portion 4*a* provided in the end-face depression 7*a* (see FIG. 3) and an electrode portion 4*b* provided in the main-face depression 7*b* (see FIG. 3). The electrode portions 4*a* and 4*b* are integrally provided. The electrode portions 4*a* and 4*b* are connected to each other at the ridge portion of the element body 2 and are electrically connected to each other.

The electrode portion 4*a* extends along the first direction D1. The electrode portion 4*a* has a rectangular shape when viewed from the second direction D2. The electrode portion 4*a* is away from the main face 2*d*, the side face 2*e*, and the side face 2*f* when viewed from the second direction D2. The electrode portion 4*b* extends along the second direction D2. The electrode portion 4*b* has a rectangular shape when viewed from the first direction D1. The electrode portion 4*b* is away from the end face 2*b*, the side face 2*e*, and the side face 2*f* when viewed from the first direction D1. Each of the electrode portions 4*a* and 4*b* extends along the third direction D3.

The terminal electrode 5 is disposed on the end face 2*b* side of the element body 2. The terminal electrode 5 is disposed from the end face 2*b* to the main face 2*c*. The terminal electrode 5 is provided in the depression 8 (see FIG. 3). The terminal electrode 5 includes an electrode portion 5*a* provided in the end-face depression 8*a* (see FIG. 3) and an electrode portion 5*b* provided in the main-face depression 8*b* (see FIG. 3). The electrode portions 5*a* and 5*b* are integrally provided. The electrode portions 5*a* and 5*b* are connected to each other at the ridge portion of the element body 2 and are electrically connected to each other.

The electrode portion 5*a* extends along the first direction D1. The electrode portion 5*a* has a rectangular shape when viewed from the second direction D2. The electrode portion 5*a* is away from the main face 2*d*, the side face 2*e*, and the side face 2*f* when viewed from the second direction D2. The electrode portion 5*b* extends along the second direction D2. The electrode portion 5*b* has a rectangular shape when viewed from the first direction D1. The electrode portion 5*b* is away from the end face 2*a*, the side face 2*e*, and the side face 2*f* when viewed from the first direction D1. Each of the electrode portions 5*a* and 5*b* extends along the third direction D3.

Figure 4:
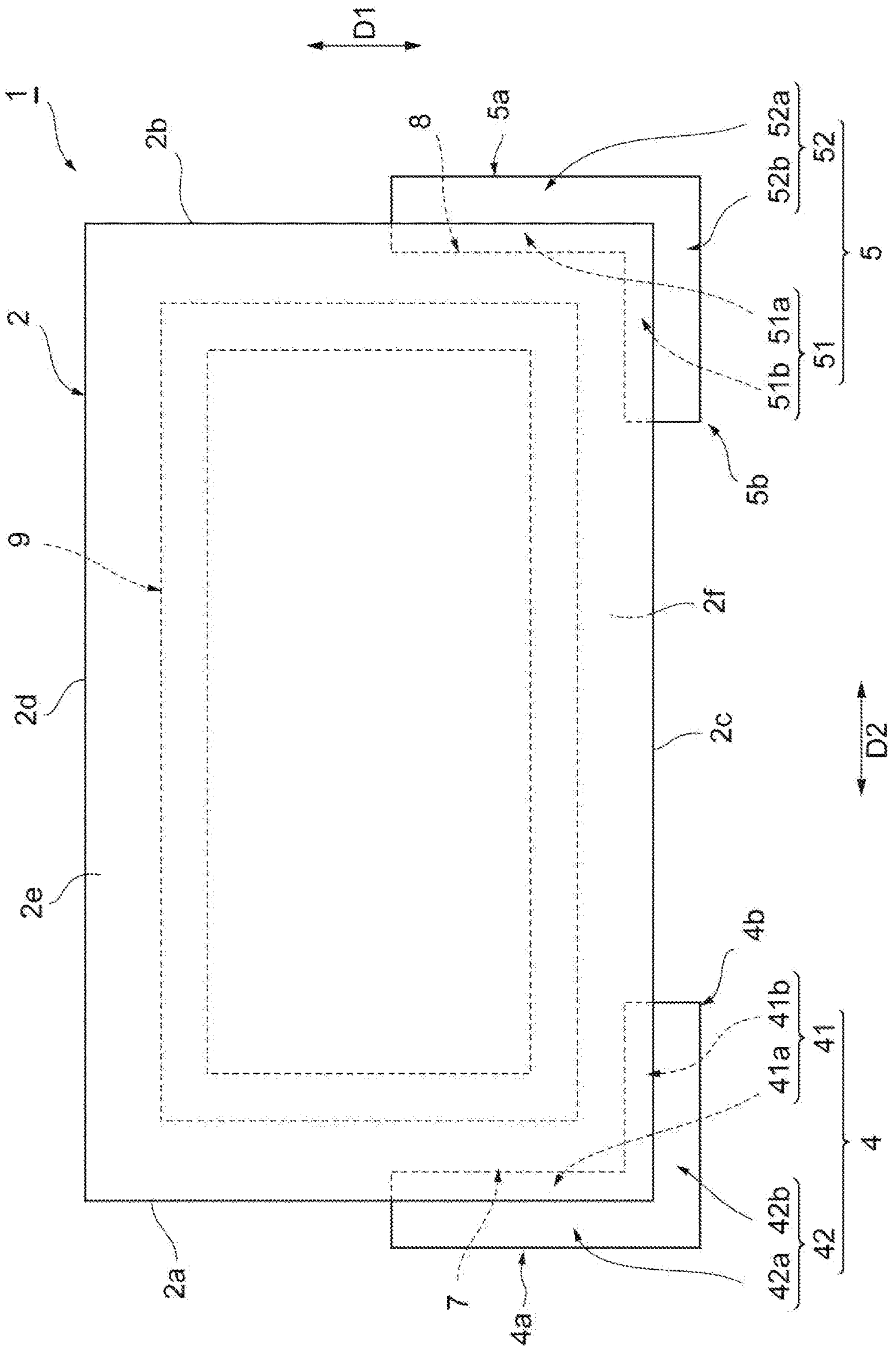
FIG. 4 is a top view of the multilayer coil component in FIG. 1.

As shown in FIG. 4, the terminal electrode 4 includes an electrode portion 41 disposed inside the depression 7 and an electrode portion 42 disposed outside the depression 7. In the present embodiment, the terminal electrode 4 is formed by the electrode portion 41 and the electrode portion 42. The electrode portion 41 is embedded in the depression 7. The electrode portion 41 has a shape corresponding to the shape of the depression 7. The electrode portion 42 protrudes from the depression 7. The electrode portions 41 and 42 are integrally provided. The electrode portions 41 and 42 are adjacent to each other in the thickness direction of the terminal electrode 4.

The electrode portion 41 includes an electrode part 41*a* embedded in the end-face depression 7*a* and an electrode part 41*b* embedded in the main-face depression 7*b*. The electrode part 41*a* has a shape corresponding to the end-face depression 7*a*. The electrode part 41*a* is embedded in the end-face depression 7*a* and is positioned further inside the element body 2 with respect to the end face 2*a*. The electrode part 41*b* has a shape corresponding to the main-face depression 7*b*. The electrode part 41*b* is embedded in the main-face depression 7*b* and is positioned further inside the element body 2 with respect to the main face 2*c*. The electrode parts 41*a* and 41*b* are integrally provided. The electrode parts 41*a* and 41*b* are connected to each other at the ridge portion of the element body 2 and are electrically connected to each other.

The electrode portion 42 includes an electrode part 42*a* protruding from the end-face depression 7*a* and an electrode part 42*b* protruding from the main-face depression 7*b*. The electrode part 42*a* protrudes from the end face 2*a* and is positioned further outside the element body 2 with respect to the end face 2*a*. The electrode part 42*b* protrudes from the main face 2*c* and is positioned further outside the element body 2 with respect to the main face 2*c*. The electrode parts 42*a* and 42*b* are integrally provided. The electrode parts 42*a* and 42*b* are connected to each other at the ridge portion of the element body 2 and are electrically connected to each other. The electrode parts 41*a* and 42*a* form the electrode portion 4*a*. The electrode parts 41*b* and 42*b* form the electrode portion 4*b*.

The electrode portion 42 is thicker than the electrode portion 41. That is, the protruding amount of the terminal electrode 4 protruding from the depression 7 (hereinafter, the protruding amount of the terminal electrode 4) is larger than the embedded amount of the terminal electrode 4 embedded in the depression 7 (hereinafter, the embedded amount of the terminal electrode 4). The protruding amount of the terminal electrode 4 can be the maximum value, that is, the protruding amount of the highest portion of the terminal electrode 4 protruding from the depression 7. The embedded amount of the terminal electrode 4 can be the maximum value, that is, the embedded amount of the deepest portion of the terminal electrode 4 embedded in the depression 7.

The protruding amount and the embedded amount of the terminal electrode 4 can be measured as follows, for example. First, a cross-sectional view of the multilayer coil component 1 taken along a plane orthogonal to the third direction D3 is acquired. The cross section at this time can be, for example, a plane that is orthogonal to the third direction D3 and positioned equidistant from the pair of side faces 2*e* and 2*f*. Then, by performing image analysis on the acquired cross-sectional view, the protruding amount and the embedded amount of the terminal electrode 4 are measured. Each of the protruding amount and the embedded amount of the terminal electrode 4 may be, for example, an average value of a plurality of measurement results obtained from a plurality of cross-sectional views orthogonal to the third direction D3.

The electrode part 42*a* is thicker than the electrode part 41*a*, and the electrode part 42*b* is thicker than the electrode part 41*b*. That is, the protruding amount of the electrode portion 4*a* protruding from the end-face depression 7*a* is larger than the embedded amount of the electrode portion 4*a* embedded in the end-face depression 7*a*, and the protruding amount of the electrode portion 4*b* protruding from the main-face depression 7*b* is larger than the embedded amount of the electrode portion 4*b* embedded in the main-face depression 7*b*. In other words, the length of the electrode part 42*a* in the second direction D2 is longer than the length of the electrode part 41*a* in the second direction D2, and the length of the electrode part 42*b* in the first direction D1 is longer than the length of the electrode part 41*b* in the first direction D1.

As shown in FIG. 2, the terminal electrode 4 is formed by laminating a plurality of electrode layers 10. In the present embodiment, the terminal electrode 4 includes a plurality of laminated electrode layers 10. In the present embodiment, the number of electrode layers 10 is "9". Each electrode layer 10 is provided in a defective portion formed in the corresponding insulator layer 6. Each electrode layer 10 is formed by firing the conductive paste provided in the defective portion formed in a green sheet. The green sheet and the conductive paste are co-fired. Thus, when the insulator layers 6 are obtained from the green sheets, the electrode layers 10 are obtained from the conductive paste. In the actual terminal electrode 4, the electrode layers 10 are integrated in such a way that no boundaries between the respective electrode layers 10 can be visually recognized. Due to the defective portions formed in the green sheets, the depression 7 in which the terminal electrode 4 is to be disposed is obtained in the fired element body 2 after firing.

Each electrode layer 10 has an L shape when viewed from the third direction D3. Each electrode layer 10 includes a plurality of layer portions 10*a* and 10*b*. In the present embodiment, each electrode layer 10 includes a pair of layer portions 10*a* and 10*b*. Each layer portion 10*a* extends along the first direction D1. Each layer portion 10*b* extends along the second direction D2. The electrode portion 4*a* is formed by laminating the layer portions 10*a* of the respective electrode layers 10. In the electrode portion 4*a*, the layer portions 10*a* are integrated in such a way that no boundaries between the respective layer portions 10*a* can be visually recognized. The electrode portion 4*b* is formed by laminating the layer portions 10*b* of the respective electrode layers 10. In the electrode portion 4*b*, the layer portions 10*b* are integrated in such a way that no boundaries between the respective layer portions 10*b* can be visually recognized.

As shown in FIG. 4, the terminal electrode 5 includes an electrode portion 51 disposed inside the depression 8 and an electrode portion 52 disposed outside the depression 8. In the present embodiment, the terminal electrode 5 is formed by the electrode portion 51 and the electrode portion 52. The electrode portion 51 is embedded in the depression 8. The electrode portion 51 has a shape corresponding to the shape of the depression 8. The electrode portion 52 protrudes from the depression 8. The electrode portions 51 and 52 are integrally provided. The electrode portions 51 and 52 are adjacent to each other in the thickness direction of the terminal electrode 5.

The electrode portion 51 includes an electrode part 51*a* embedded in the end-face depression 8*a* and an electrode part 51*b* embedded in the main-face depression 8*b*. The electrode part 51*a* has a shape corresponding to the end-face depression 8*a*. The electrode part 51*a* is embedded in the end-face depression 8*a* and is positioned further inside the element body 2 with respect to the end face 2*b*. The electrode part 51*b* has a shape corresponding to the main-face depression 8*b*. The electrode part 51*b* is embedded in the main-face depression 8*b* and is positioned further inside the element body 2 with respect to the main face 2*c*. The electrode parts 51*a* and 51*b* are integrally provided. The electrode parts 51*a* and 51*b* are connected to each other at the ridge portion of the element body 2 and are electrically connected to each other.

The electrode portion 52 includes an electrode part 52*a* protruding from the end-face depression 8*a* and an electrode part 52*b* protruding from the main-face depression 8*b*. The electrode part 52*a* protrudes from the end face 2*b* and is positioned further outside the element body 2 with respect to the end face 2*b*. The electrode part 52*b* protrudes from the main face 2*c* and is positioned further outside the element body 2 with respect to the main face 2*c*. The electrode parts 52*a* and 52*b* are integrally provided. The electrode parts 52*a* and 52*b* are connected to each other at the ridge portion of the element body 2 and are electrically connected to each other. The electrode parts 51*a* and 52*a* form the electrode portion 5*a*. The electrode parts 51*b* and 52*b* form the electrode portion 5*b*.

The electrode portion 52 is thicker than the electrode portion 51. That is, the protruding amount of the terminal electrode 5 protruding from the depression 8 (hereinafter, the protruding amount of the terminal electrode 5) is larger than the embedded amount of the terminal electrode 5 embedded in the depression 8 (hereinafter, the embedded amount of the terminal electrode 5). The protruding amount of the terminal electrode 5 can be the maximum value, that is, the protruding amount of the highest portion of the terminal electrode 5 protruding from the depression 8. The embedded amount of the terminal electrode 5 can be the maximum value, that is, the embedded amount of the deepest portion of the terminal electrode 5 embedded in the depression 8.

The protruding amount and the embedded amount of the terminal electrode 5 can be measured as follows, for example. First, a cross-sectional view of the multilayer coil component 1 taken along a plane orthogonal to the third direction D3 is acquired. The cross section at this time can be, for example, a plane that is orthogonal to the third direction D3 and positioned equidistant from the pair of side faces 2*e* and 2*f*. Then, by performing image analysis on the acquired cross-sectional view, the protruding amount and the embedded amount of the terminal electrode 5 are measured. Each of the protruding amount and the embedded amount of the terminal electrode 5 may be, for example, an average value of a plurality of measurement results obtained from a plurality of cross-sectional views orthogonal to the third direction D3.

The electrode part 52*a* is thicker than the electrode part 51*a*, and the electrode part 52*b* is thicker than the electrode part 51*b*. That is, the protruding amount of the electrode portion 5*a* protruding from the end-face depression 8*a* is larger than the embedded amount of the electrode portion 5*a* embedded in the end-face depression 8*a*, and the protruding amount of the electrode portion 5*b* protruding from the main-face depression 8*b* is larger than the embedded amount of the electrode portion 5*b* embedded in the main-face depression 8*b*. In other words, the length of the electrode part 52*a* in the second direction D2 is longer than the length of the electrode part 51*a* in the second direction D2, and the length of the electrode part 52*b* in the first direction D1 is longer than the length of the electrode part 51*b* in the first direction D1.

As shown in FIG. 2, the terminal electrode 5 is formed by laminating a plurality of electrode layers 11. In the present embodiment, the terminal electrode 5 includes a plurality of laminated electrode layers 11. In the present embodiment, the number of electrode layers 11 is "9". Each electrode layer 11 is provided in a defective portion formed in the corresponding insulator layer 6. Each electrode layer 11 is formed by firing the conductive paste provided in the defective portion formed in a green sheet. The green sheet and the conductive paste are co-fired. Thus, when the insulator layers 6 are obtained from the green sheets, the electrode layers 11 are obtained from the conductive paste. In the actual terminal electrode 5, the electrode layers 11 are integrated in such a way that no boundaries between the respective electrode layers 11 can be visually recognized. Due to the defective portions formed in the green sheets, the depression 8 in which the terminal electrode 5 is to be disposed is obtained in the fired element body 2 after firing.

Each electrode layer 11 has an L shape when viewed from the third direction D3. Each electrode layer 11 includes a plurality of layer portions 11*a* and 11*b*. In the present embodiment, each electrode layer 11 includes a pair of layer portions 11*a* and 11*b*. Each layer portion 11*a* extends along the first direction D1. Each layer portion 11*b* extends along the second direction D2. The electrode portion 5*a* is formed by laminating the layer portions 11*a* of the respective electrode layers 11. In the electrode portion 5*a*, the layer portions 11*a* are integrated in such a way that no boundaries between the respective layer portions 11*a* can be visually recognized. The electrode portion 5*b* is formed by laminating the layer portions 11*b* of the respective electrode layers 11. In the electrode portion 5*b*, the layer portions 11*b* are integrated in such a way that no boundaries between the respective layer portions 11*b* can be visually recognized.

As shown in FIG. 4, the multilayer coil component 1 includes a coil 9 disposed in the element body 2. The coil axis of the coil 9 extends along the third direction D3. The outer shape of the coil 9 has a substantially rectangular shape when viewed from the third direction D3.*e*

As shown in FIG. 2, the coil 9 (see FIG. 4) includes a first coil conductor 20, a second coil conductor 21, a third coil conductor 22, a fourth coil conductor 23, and a fifth coil conductor 24. The first coil conductor 20, the second coil conductor 21, the third coil conductor 22, the fourth coil conductor 23, and the fifth coil conductor 24 are disposed along the third direction D3 in the order of the first coil conductor 20, the second coil conductor 21, the third coil conductor 22, the fourth coil conductor 23, and the fifth coil conductor 24. The first coil conductor 20, the second coil conductor 21, the third coil conductor 22, the fourth coil conductor 23, and the fifth coil conductor 24 each have a substantially rectangular shape in which a part of the loop is disconnected and each include one end and the other end. The first coil conductor 20, the second coil conductor 21, the third coil conductor 22, the fourth coil conductor 23, and the fifth coil conductor 24 each include a portion linearly extending along the first direction D1 and a portion linearly extending along the second direction D2. The first coil conductor 20, the second coil conductor 21, the third coil conductor 22, the fourth coil conductor 23, and the fifth coil conductor 24 are each formed with a predetermined width.

The coil 9 (see FIG. 4) includes a first connecting conductor 30, a second connecting conductor 31, a third connecting conductor 32, and a fourth connecting conductor 33. The first connecting conductor 30, the second connecting conductor 31, the third connecting conductor 32, and the fourth connecting conductor 33 are disposed along the third direction D3 in the order of the first connecting conductor 30, the second connecting conductor 31, the third connecting conductor 32, and the fourth connecting conductor 33. The first connecting conductor 30, the second connecting conductor 31, the third connecting conductor 32, and the fourth connecting conductor 33 each have a substantially rectangular shape when viewed from the third direction D3.

The first coil conductor 20 is positioned in the same layer as one electrode layer 10 and one electrode layer 11. The first coil conductor 20 is connected to the electrode layer 11 via a coupling conductor 25. The coupling conductor 25 is positioned in the same layer as the first coil conductor 20. One end of the first coil conductor 20 is connected to the coupling conductor 25. The coupling conductor 25 is connected to the layer portion 11*a*. The coupling conductor 25 couples the first coil conductor 20 and the electrode layer 11. The coupling conductor 25 may be connected to the layer portion 11*b*. The first coil conductor 20 is away from the electrode layer 10 positioned in the same layer. In the present embodiment, the first coil conductor 20, the coupling conductor 25, and the electrode layer 11 are integrally formed.

The first connecting conductor 30 is disposed in the insulator layer 6 between the first coil conductor 20 and the second coil conductor 21. In the insulator layer 6 in which the first connecting conductor 30 is disposed, one electrode layer 10 and one electrode layer 11 are positioned. The first connecting conductor 30 is away from the electrode layers 10 and 11 positioned in the same layer. The first connecting conductor 30 is disposed in such a way as to overlap the other end of the first coil conductor 20 and one end of the second coil conductor 21 when viewed from the third direction D3. The first connecting conductor 30 is connected to the other end of the first coil conductor 20 and is also connected to the one end of the second coil conductor 21. The first connecting conductor 30 couples the first coil conductor 20 and the second coil conductor 21.

The second coil conductor 21 is positioned in the same layer as one electrode layer 10 and one electrode layer 11. The second coil conductor 21 is away from the electrode layers 10 and 11 positioned in the same layer. The first coil conductor 20 and the second coil conductor 21 are adjacent to each other in the third direction D3 while the insulator layer 6 is interposed between the first coil conductor 20 and the second coil conductor 21. When viewed from the third direction D3, the one end of the second coil conductor 21 overlaps the other end of the first coil conductor 20 via the first connecting conductor 30.

The second connecting conductor 31 is disposed in the insulator layer 6 between the second coil conductor 21 and the third coil conductor 22. In the insulator layer 6 in which the second connecting conductor 31 is disposed, one electrode layer 10 and one electrode layer 11 are positioned. The second connecting conductor 31 is away from the electrode layers 10 and 11 positioned in the same layer. The second connecting conductor 31 is disposed in such a way as to overlap the other end of the second coil conductor 21 and one end of the third coil conductor 22 when viewed from the third direction D3. The second connecting conductor 31 is connected to the other end of the second coil conductor 21 and is also connected to the one end of the third coil conductor 22. The second connecting conductor 31 couples the second coil conductor 21 and the third coil conductor 22.

The third coil conductor 22 is positioned in the same layer as one electrode layer 10 and one electrode layer 11. The third coil conductor 22 is away from the electrode layers 10 and 11 positioned in the same layer. The second coil conductor 21 and the third coil conductor 22 are adjacent to each other in the third direction D3 while the insulator layer 6 is interposed between the second coil conductor 21 and the third coil conductor 22. When viewed from the third direction D3, the one end of the third coil conductor 22 overlaps the other end of the second coil conductor 21 via the second connecting conductor 31.

The third connecting conductor 32 is disposed in the insulator layer 6 between the third coil conductor 22 and the fourth coil conductor 23. In the insulator layer 6 in which the third connecting conductor 32 is disposed, one electrode layer 10 and one electrode layer 11 are positioned. The third connecting conductor 32 is away from the electrode layers 10 and 11 positioned in the same layer. The third connecting conductor 32 is disposed in such a way as to overlap the other end of the third coil conductor 22 and one end of the fourth coil conductor 23 when viewed from the third direction D3. The third connecting conductor 32 is connected to the other end of the third coil conductor 22 and is also connected to the one end of the fourth coil conductor 23. The third connecting conductor 32 couples the third coil conductor 22 and the fourth coil conductor 23.

The fourth coil conductor 23 is positioned in the same layer as one electrode layer 10 and one electrode layer 11. The fourth coil conductor 23 is away from the electrode layers 10 and 11 positioned in the same layer. The third coil conductor 22 and the fourth coil conductor 23 are adjacent to each other in the third direction D3 while the insulator layer 6 is interposed between the third coil conductor 22 and the fourth coil conductor 23. When viewed from the third direction D3, the one end of the fourth coil conductor 23 overlaps the other end of the third coil conductor 22 via the third connecting conductor 32.

The fourth connecting conductor 33 is disposed in the insulator layer 6 between the fourth coil conductor 23 and the fifth coil conductor 24. In the insulator layer 6 in which the fourth connecting conductor 33 is disposed, one electrode layer 10 and one electrode layer 11 are positioned. The fourth connecting conductor 33 is away from the electrode layers 10 and 11 positioned in the same layer. The fourth connecting conductor 33 is disposed in such a way as to overlap the other end of the fourth coil conductor 23 and one end of the fifth coil conductor 24 when viewed from the third direction D3. The fourth connecting conductor 33 is connected to the other end of the fourth coil conductor 23 and is also connected to the one end of the fifth coil conductor 24. The fourth connecting conductor 33 couples the fourth coil conductor 23 and the fifth coil conductor 24.

The fifth coil conductor 24 is positioned in the same layer as one electrode layer 10 and one electrode layer 11. When viewed from the third direction D3, the one end of the fifth coil conductor 24 overlaps the other end of the fourth coil conductor 23 via the fourth connecting conductor 33. The fifth coil conductor 24 is connected to the electrode layer 10 via a coupling conductor 26. The coupling conductor 26 is positioned in the same layer as the fifth coil conductor 24. The other end of the fifth coil conductor 24 is connected to the coupling conductor 26. The coupling conductor 26 is connected to the layer portion 10*a*. The coupling conductor 26 couples the fifth coil conductor 24 and the electrode layer 10. The coupling conductor 26 may be connected to the layer portion 10*b*. The fifth coil conductor 24 is away from the electrode layer 11 positioned in the same layer. In the present embodiment, the fifth coil conductor 24, the coupling conductor 26, and the electrode layer 10 are integrally formed.

The first coil conductor 20, the second coil conductor 21, the third coil conductor 22, the fourth coil conductor 23, and the fifth coil conductor 24 are electrically connected through the first connecting conductor 30, the second connecting conductor 31, the third connecting conductor 32, and the fourth connecting conductors 33. The first coil conductor 20, the second coil conductor 21, the third coil conductor 22, the fourth coil conductor 23, and the fifth coil conductor 24 form the coil 9 (see FIG. 4). The coil 9 is electrically connected to the terminal electrode 5 through the coupling conductor 25. The coil 9 is electrically connected to the terminal electrode 4 through the coupling conductor 26.

The coil conductors 20 to 24, the coupling conductors 25 and 26, and the connecting conductors 30 to 33 each contain a conductive material. The conductive material contains Ag or Pd. The coil conductors 20 to 24, the coupling conductors 25 and 26, and the connecting conductors 30 to 33 are each formed as a sintered body of a conductive paste containing conductive material powder. The conductive material powder contains, for example, Ag powder or Pd powder. In the present embodiment, the coil conductors 20 to 24, the coupling conductors 25 and 26, and the connecting conductors 30 to 33 each contain the same conductive material as that of the terminal electrodes 4 and 5. The coil conductors 20 to 24, the coupling conductors 25 and 26, and the connecting conductors 30 to 33 may each contain a conductive material different from that of the terminal electrodes 4 and 5.

The coil conductors 20 to 24, the coupling conductors 25 and 26, and the connecting conductors 30 to 33 are each provided in the defective portion formed in the corresponding insulator layer 6. The coil conductors 20 to 24, the coupling conductors 25 and 26, and the connecting conductors 30 to 33 are each formed by firing the conductive paste positioned in the defective portion formed in the green sheet. As described above, the green sheet and the conductive paste are co-fired. Thus, when the insulator layers 6 are obtained from the green sheets, the coil conductors 20 to 24, the coupling conductors 25 and 26, and the connecting conductors 30 to 33 are obtained from the conductive paste.

The defective portion formed in the green sheet is formed by, for example, the following process. First, a green sheet is formed by applying an element-body paste containing a constituent material of the insulator layer 6 and a photosensitive material on a substrate. The substrate is, for example, a PET film. The photosensitive material contained in the element-body paste may be either a negative type or a positive type, and a known photosensitive material can be used. Then, using the mask corresponding to the defective portion, the green sheet is exposed and developed by a photolithography method to form the defective portion in the green sheet on the substrate. The green sheet in which the defective portion is formed is an element-body pattern.

The coil conductors 20 to 24, the coupling conductors 25 and 26, and the connecting conductors 30 to 33 are each formed by, for example, the following process.

First, a conductor material layer is formed by applying a conductive paste containing a photosensitive material on a substrate. The photosensitive material contained in the conductive paste may be either a negative type or a positive type, and a known photosensitive material can be used. Then, using the mask corresponding to the defective portion, the conductor material layer is exposed and developed by a photolithography method to form a conductor pattern corresponding to the shape of the defective portion on the substrate.

The multilayer coil component 1 is obtained by, for example, the following process following the process described above. The conductor pattern is combined with the defective portion of the element-body pattern to prepare a sheet in which the element-body pattern and the conductor pattern are in the same layer. A predetermined number of prepared sheets are laminated to obtain a laminated body. The obtained laminated body is fired. The multilayer coil component 1 is thereby obtained. In the multilayer coil component 1, the terminal electrodes 4 and 5 and the coil 9 are integrally formed.

As described above, in the multilayer coil component 1 according to the present embodiment, the depressions 7 and 8 are provided on the outer surfaces of the element body 2, and the terminal electrodes 4 and 5 include the electrode portions 41 and 51 disposed in the depressions 7 and 8 and the electrode portions 42 and 52 protruding from the depressions 7 and 8. Thus, as compared with the case in which the terminal electrodes 4 and 5 do not include the electrode portions 42 and 52, that is, the case in which the entire terminal electrodes 4 and 5 are disposed in the depressions 7 and 8, the stress generated between the element body 2 and the terminal electrodes 4 and 5 due to the difference in the thermal shrinkage coefficient is reduced when, for example, the element body 2 and the terminal electrodes 4 and 5 are co-fired. As a result, the occurrence of cracks is suppressed. In addition, since the electrode portions 42 and 52 are thicker than the electrode portions 41 and 51, the occurrence of cracks is further suppressed. Furthermore, in the multilayer coil component 1, the stress generated between the element body 2 and the terminal electrodes 4 and 5 due to the difference in thermal expansion coefficient is also reduced during use, for example. As a result, the occurrence of cracks during use is also suppressed. Moreover, since the terminal electrodes 4 and 5 include the electrode portions 41 and 51, the adhesion force (fixing force) between the terminal electrodes 4 and 5 and the element body 2 is improved, and the peeling of the terminal electrodes 4 and 5 is suppressed. In the multilayer coil component 1, deformation of the element body 2 is also suppressed.

The result of measuring the crack occurrence rate for each protruding amount and embedded amount of the terminal electrode will be described. Table 1 shows the relation between the crack occurrence rate, and the protruding amount and the embedded amount of the terminal electrode. For multilayer coil components having a length of 0.4 mm, width of 0.2 mm, and height of 0.2 mm (chip size "0402") and multilayer coil components having a length of 0.250 mm, width of 0.125 mm, and height of 0.125 mm (chip size "0201"), the crack occurrence rate was each measured by changing the embedded amount and the protruding amount of the terminal electrode. The thickness of all terminal electrodes was 20 μm. The number of respective samples was 25.

TABLE 1

| Chip size | Protruding amount (μm) | Embedded amount (μm) | Crack occurrence rate |
|---|---|---|---|
| 0402 | 0 | 20 | 56% |
| 0402 | 5 | 15 | 32% |
| 0402 | 8 | 12 | 16% |
| 0402 | 12 | 8 | 0% |

TABLE 1-continued

| Chip size | Protruding amount (μm) | Embedded amount (μm) | Crack occurrence rate |
|---|---|---|---|
| 0402 | 15 | 5 | 0% |
| 0201 | 0 | 20 | 36% |
| 0201 | 5 | 15 | 24% |
| 0201 | 8 | 12 | 8% |
| 0201 | 12 | 8 | 0% |
| 0201 | 15 | 5 | 0% |

Figure 5:
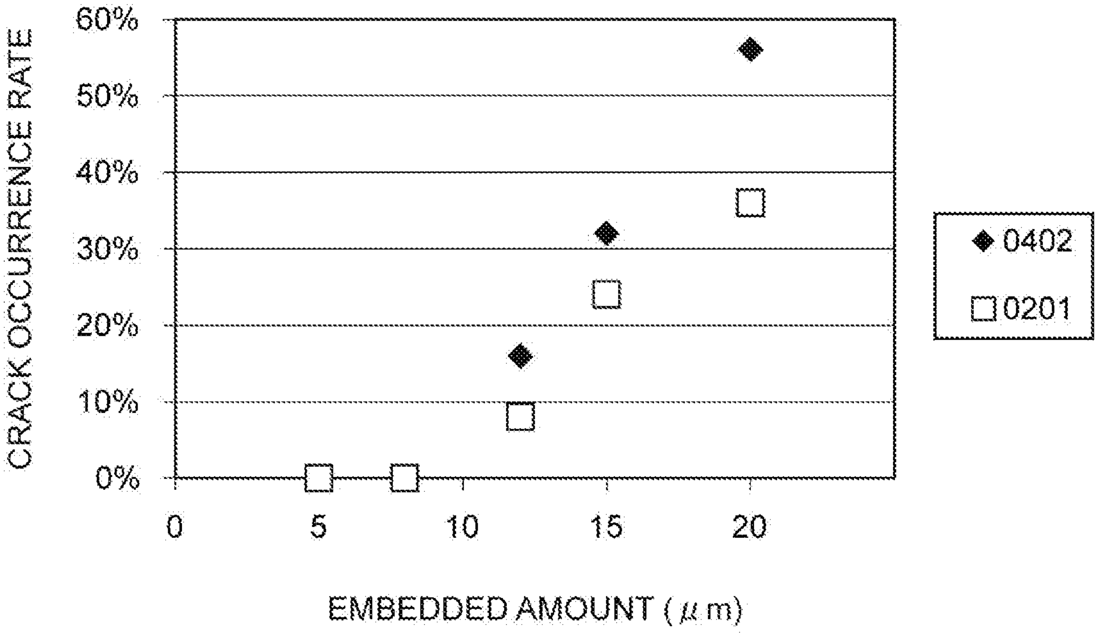
FIG. 5 is a graph showing the relation between the crack occurrence rate and the embedded amount of a terminal electrode.

FIG. 5 is a graph showing the relation between the crack occurrence rate and the embedded amount of the terminal electrode. In FIG. 5, the horizontal axis indicates the embedded amount of the terminal electrode, and the vertical axis indicates the crack occurrence rate. As shown in Table 1 and FIG. 5, in any chip-size of multilayer coil components, the crack occurrence rate was reduced as the protruding amount of the terminal electrode was increased. In particular, when the protruding amount of the terminal electrode exceeded the embedded amount, the crack occurrence rate was 0%, and the occurrence of cracks was certainly suppressed.

The terminal electrodes 4 and 5 include the electrode parts 41*a* and 51*a* disposed in the end-face depressions 7*a* and 8*a*, and the electrode parts 41*b* and 51*b* disposed in the main-face depressions 7*b* and 8*b*. In this way, the terminal electrodes 4 and 5 are provided not only on the main face 2*c* side of the element body 2 but also on the end faces 2*a* and 2*b* sides, and the peeling of the terminal electrodes 4 and 5 is suppressed. That is, the peeling of the terminal electrodes 4 and 5 is further suppressed as compared with the case in which the terminal electrodes 4 and 5 include only the electrode parts 41*a* and 51*a* or only the electrode parts 41*b* and 51*b*.

The element body 2 contains a sintered body of an insulating material, and the terminal electrodes 4 and 5 each contain a sintered body of a conductive material. Thus, when, for example, the element body 2 and the terminal electrodes 4 and 5 are formed by co-firing, it is possible to suppress the occurrence of cracks due to the difference between the thermal shrinkage coefficient when the insulating material becomes the element body 2 and the thermal shrinkage coefficient when the conductive material becomes the terminal electrodes 4 and 5.

The multilayer coil component 1 includes a plurality (in this specification, a pair) of terminal electrodes 4 and 5. Thus, the occurrence of cracks due to the plurality of terminal electrodes 4 and 5 is further suppressed.

In the multilayer coil component 1, it is possible to increase the inner diameter of the coil 9 as compared with the case in which the terminal electrodes 4 and 5 include only the electrode portions 41 and 51 and do not include the electrode portions 42 and 52, that is, the case in which the entire terminal electrodes 4 and 5 are embedded in the depressions 7 and 8. As a result, it is possible to improve the characteristics of the coil 9. Moreover, since the electrode portions 42 and 52 are thicker than the electrode portions 41 and 51, it is possible to further increase the inner diameter of the coil 9. Thus, it is possible to further improve the characteristics of the coil 9.

The embodiment of the present invention has been described above, but the present invention is not necessarily limited to the above described embodiment, and can be variously changed without departing from the gist.

In the above embodiment, it has been exemplified that the coil 9 includes the first coil conductor 20, the second coil conductor 21, the third coil conductor 22, the fourth coil conductor 23, the fifth coil conductor 24, the coupling conductor 25, the coupling conductor 26, the first connecting conductor 30, the second connecting conductor 31, the third connecting conductor 32, and the fourth connecting conductor 33. However, the number of respective conductors forming the coil 9 is not limited to the above.

In the above embodiment, it has been exemplified that the terminal electrode 4 includes the electrode portion 4*a* and the electrode portion 4*b*. However, the terminal electrode 4 may include only the electrode portion 4*a* or only the electrode portion 4*b*. The terminal electrode 5 may also include only the electrode portion 5*a* or only the electrode portion 5*b*.

In the above embodiment, the multilayer coil component 1 has been described as an example of an electronic component, but the present invention is not limited to this, and can be applied to other multilayer electronic components, such as multilayer capacitors, multilayer varistors, multilayer piezoelectric actuators, multilayer thermistors, and multilayer composite components, or electronic components other than multilayer electronic components.

What is claimed is:

1. An electronic component comprising:

an element body including outermost, flat surfaces and a depression that is recessed from the outermost, flat surfaces; and a terminal electrode on the element body, wherein the terminal electrode includes a first electrode portion in the depression and an integral second electrode portion protruding beyond the outermost, flat surfaces from the depression, the second electrode portion is thicker than the first electrode portion, the outermost, flat surfaces include a main face constituting a mounting surface and an end face adjacent to the main face, the depression includes an end-face depression in the end face and a main-face depression in the main face, the first electrode portion includes a first end-face electrode part in the end-face depression and a first main-face electrode part in the main-face depression, the second electrode portion includes a second end-face electrode part protruding beyond the end face from the end-face depression and a second main-face electrode part protruding beyond the main face from the main-face depression, the element body contains a sintered body of an insulating material, the terminal electrode contains a sintered body of a conductive material, the first electrode portion and the second electrode portion are comprised of a same material, each of the first main-face electrode part and the second main-face electrode part has a flat end edge surface that is (i) parallel to the end face and (ii) is a continuous flat surface between all edges of the flat end edge surface, the flat end edge surfaces of the first main-face electrode part and the second main-face electrode part abut edge-to-edge to form a combined continuous flat edge surface, and the first main-face electrode part and the first end-face electrode part have a same thickness.

2. The electronic component according to claim 1, wherein the element body has a rectangular parallelepiped shape, the outermost, flat surfaces include a second main face opposed to the first main face; a pair of side faces opposed to each other; and a pair of end faces opposed to each other, the electronic component has a length of 1 mm or less in a direction in which the pair of side faces are opposed to each other, and the electronic component has a length of 2 mm or less in a direction in which the pair of end faces are opposed to each other.

3. The electronic component according to claim 1, wherein the terminal electrode includes a plurality of the terminal electrodes.

4. The electronic component according to claim 1, wherein the element body includes a plurality of element body layers which are laminated.

5. The electronic component according to claim 1, wherein the terminal electrode includes a plurality of electrode layers which are laminated.

6. The electronic component according to claim 1, wherein the first end-face electrode part and the second end-face electrode part are connected to each other, and the first main-face electrode part and the second main-face electrode part are connected to each other.

7. The electronic component according to claim 1, wherein:

the coil has a coil axis in a first direction;

the terminal electrode has an L-shape when viewed in the first direction; and the terminal electrode is formed by layers stacked in the first direction.

8. The electronic component according to claim 1, further comprising a coil in the element body, wherein the terminal electrode is connected to the coil.

9. The electronic component according to claim 8, wherein the element body includes a plurality of element body layers which are laminated, and the coil includes an axis extending along a direction in which the plurality of element body layers are laminated.

10. The electronic component according to claim 8, wherein the terminal electrode includes a plurality of electrode layers which are laminated, and the coil includes an axis extending along a direction in which the plurality of electrode layers are laminated.

* * * * *